Sept. 7, 1948.   F. L. SELAK   2,448,631
POWER HAY BUCK

Filed March 1, 1946   2 Sheets-Sheet 1

Inventor
FRANK L. SELAK,
By
Attorneys

Sept. 7, 1948.  F. L. SELAK  2,448,631
POWER HAY BUCK
Filed March 1, 1946  2 Sheets-Sheet 2
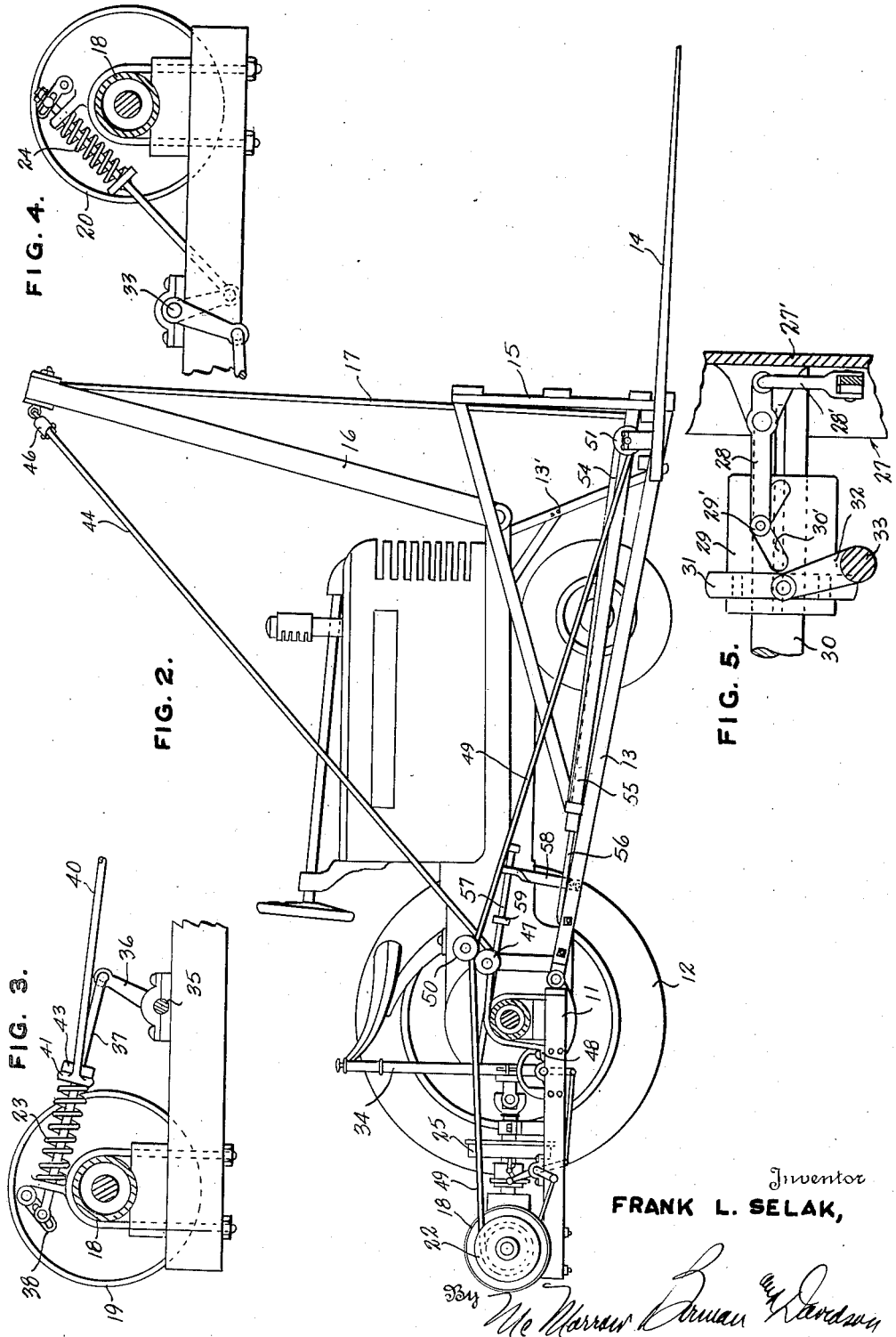
Inventor
FRANK L. SELAK, Patented Sept. 7, 1948

2,448,631

UNITED STATES PATENT OFFICE 2,448,631

POWER HAY BUCK

Frank L. Selak, Albia, Iowa

Application March 1, 1946, Serial No. 651,063

9 Claims. (Cl. 214—131)

This invention relates to agricultural equipment and more particularly to a hay stacker which is mounted on and driven by a tractor.

A main object of the invention is to provide a novel and improved hay stacker device of simple construction which is easy to operate and which is very efficient in operation.

A further object of the invention is to provide an improved hay stacker device employing a rake or buck for gathering, elevating and unloading hay, said device being mounted on and driven by a tractor, the device being assembled from inexpensive parts and being provided with easily operated control means for enabling the operator of the tractor to gather up hay, elevate the hay and unload the hay in successive operations of the device.

Further objects and advantages of the invention will become apparent from the following description and claims and from the accompanying drawings, wherein:

Figure 2 is a side elevational view of the hay stacker device of Figure 1.

Figure 3 is a detail cross-sectional view taken on line 3—3 of Figure 1.

Figure 4 is a detail cross-sectional view taken on line 4—4 of Figure 1a.

Figure 5 is a detail cross-sectional view taken on line 5—5 of Figure 1.

Figures 1, 1A:
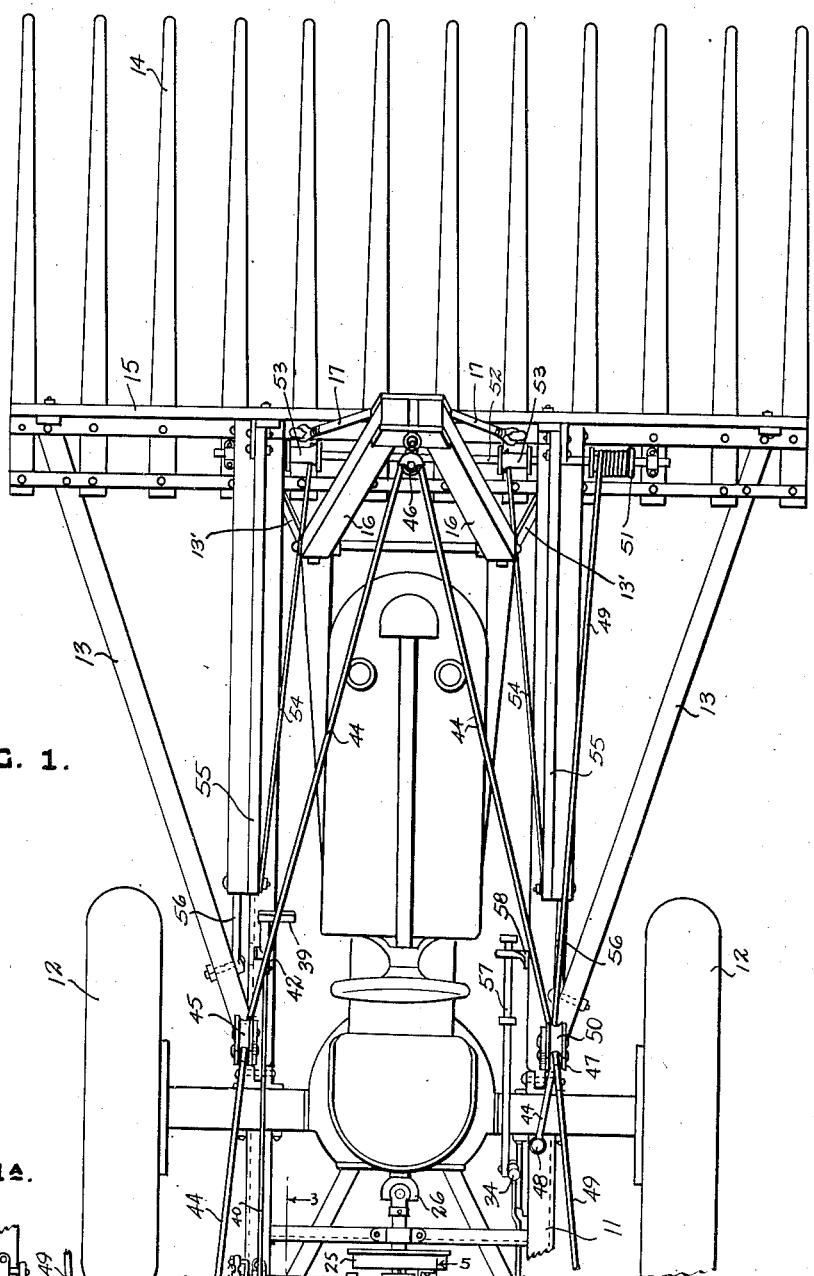
Fig. 1 is a top plan view of a hay stacker device constructed in accordance with the present invention.
Figure 1a is a detail plan view of structure forming a portion of the hay stacker device of Figure 1.

Referring to the drawings, 11 designates the chassis of a conventional tractor having large rear wheels 12, 12. Pivotally secured to frame 11 slightly ahead of and below the rear axles of the tractor are a pair of diverging boom members 13, 13 to the forward ends of which is secured a hay rake structure 14. Slidably mounted on hay rake 14 and extending transversely thereof is a hay buck or ram member 15 adapted to be moved forwardly to push a load of hay off the hay rake.

Hay rake 14 is supported at its lowered position and partially guided in its upward movement by a pair of depending bracket members 13', 13' secured to the forward portion of the tractor chassis.

Pivotally secured to the forward end of the tractor frame are a pair of forwardly and upwardly extending convergent post members 16, 16 secured together at their top ends. The joined top ends of members 16, 16 are respectively connected to hay rake 14 by heavy cables 17, 17 so that the hay rake is raised responsive to rearward rotation of post members 16, 16.

Mounted on the rear portion of chassis 11 and extending transversely thereof is a conventional automotive rear axle and differential assembly 18, the rear axles being provided with respective brake drums 19 and 20, the end of the axle carrying brake drum 19 having rigidly secured thereto a cable reel 21 and the end of the axle carrying brake drum 20 having rigidly secured thereto a cable reel 22. The brake shoes associated with drum 19 are normally biased to braking position and the brake shoes associated with drum 20 are normally out of braking position. Reel 22 is therefore normally free and reel 21 is normally held stationary relative to the housing of the rear axle assembly 18.

The driving gear of the differential mechanism of assembly 18 is connected to the driven portion of a clutch assembly 25, the driving portion of said clutch assembly being coupled through a universal joint 26 to the power take-off shaft of the tractor. The clutch is normally disengaged and is of a conventional type comprising a driven shoe structure 27 contained in a suitable housing connected to the driving shaft. Shoe structure 27 is expansive against the inner periphery of its housing by the action of a lever member 28 pivoted to a support disc 27' carried at the end of driven shaft 30. One end of lever 28 is connected to a link 28' which is in turn connected to the expansion shoe elements of the shoe structure and causes said shoe elements to engage the inner periphery of the clutch housing responsive to upward movement of link 28'. The other end of lever 28 is provided with a follower element 29' which engages in a V-shaped groove 30' formed in a sleeve member 29 which is slidably but non-rotatively mounted on the driven shaft 30. Rotatively mounted in a peripheral groove formed therefor in sleeve member 29 is a ring member 31 which is linked by an arm 32 to a transverse shaft 33 which may be rocked in either direction to thereby rotate lever 28 and to cause link 28' to move upwardly, engaging the clutch. The rotation of shaft 33 is controlled by a hand lever 34 which is connected by a suitable linkage to said shaft. When the clutch is in its normal disengaged position, hand lever 34 is vertical as shown in Figure 2. The clutch may be engaged by rotating hand lever 34 either forwardly or rearwardly. Ring member 31 is also linked to a transverse shaft 35 which carries an arm 36. Arm 36 is linked by a rod member 37 to the brake release lever 38 of the brake shoes associated with brake drum 19. Forward rotation of hand lever 34 is therefore transmitted to release lever 38 to release brake drum 19 as the clutch is engaged, brake drum 20 meanwhile being locked in stationary position. A similar connection for shaft 33 is made to the release lever of the brake shoes associated with brake drum 20 whereby rearward rotation of hand lever 34 toward clutch-engaging position releases brake drum 20, while brake drum 19 remains locked in stationary position. Biasing springs 23 and 24 cooperating with the respective rod members associated with the brake release levers exert balanced forces on the clutch-brake actuating linkage system which normally maintain hand lever 34 in its vertical position.

The brake releasing mechanism for brake drum 19 is arranged so that rod member 37 is required to move back only a short distance to release the brake drum whereas full forward movement of hand lever 34 is required to engage the clutch. Brake drum 19 may be therefore at times released independently of clutch engagement. For this purpose a bent lever 42 is pivoted to the tractor chassis, one arm thereof being formed with a foot pedal 39 and the other arm thereof being connected to a link 40 having an eye 41 formed on the end thereof which encircles rod member 37 and abuts a collar 43 integrally carried by said rod member. By actuating foot pedal 39 to produce forward rotation of bent lever 42 rod member 37 is moved forwardly sufficient to release brake drum 19 without causing sleeve member 29 to be moved forwardly a sufficient distance to engage the clutch.

Wound on reel 21 is a cable 44 which is threaded under a first guide pulley 45 secured to the tractor chassis, threaded through a pulley sheave 46 carried by the top portion of the joined structure formed by post members 16, 16, threaded under a second guide pulley 47 secured to the tractor chassis, and secured to the tractor chassis at 48. When cable 44 is wound up on reel 21 the joined post members 16, 16 are thereby rotated rearwardly, causing hay rake 14 to be elevated.

Wound on reel 22 is a cable 49 which is threaded under a pulley 50 secured to the tractor chassis and in turn is wound on a drum 51 carried on a transverse shaft 52 journalled in suitable brackets mounted on the rear portion of hay rake 14. Also carried on transverse shaft 52 are a pair of reels 53, 53 on which are wound cables 54, 54, these cables being wound in the reverse direction to the cable 49 on the drum 51. Each cable 54 is secured to the rearward end of a tubular member 55 secured at its forward end to hay buck member 15. Each tubular member 55 telescopically receives a guide rod member 56 which is secured at its rearward end to one of the boom members 13. When cable 49 is wound up on reel 22, reel 51 is unwound, causing rotation of shaft 52 and causing cables 54, 54 to be wound up on reels 53, 53. This moves hay buck member 15 forwardly on hay rake 14. When the device is employed to gather hay, the pressure of hay against extended hay buck member 15 moves said member 15 rearwardly causing cables 54, 54 to unwind from reels 53, 53 and rewinding cable 49 on reel 51.

Pivotally secured to hand lever 34 is an elongated arm 57 slidably supported in an upstanding bracket 58 carried by one of the boom members 13. Arm 57 is provided with a stop collar 59 which is abutted by bracket 58 when the boom member has been swung upwardly to its highest safe position and thereby automatically returns hand lever 34 to a clutch-disengaging position.

In operation, when the rake 14 has been loaded with hay, hand lever 34 is moved forwardly to clutch-engaging position. This releases brake drum 19 and causes cable 44 to be wound on reel 21, thereby elevating the hay rake 14. When the desired elevation of hay rake 14 has been reached hand lever 34 is returned to its mid-position. Brake drum 19 is now locked in braking position and the clutch is disengaged. Hand lever 34 is then moved rearwardly to clutch-engaging position. This rotates brake drum 20 and causes cable 49 to be wound on drum 22, thereby rotating shaft 52 and causing cables 54, 54 to move the hay buck member 15 forwardly, thereby discharging the hay from rake 14. Hand lever 34 is then returned to mid-position, whereby the clutch is disengaged. The rake is then lowered by stepping on foot pedal 39 which releases brake drum 19. Since the driving gear of the differential mechanism is now free, drum 21 is free to rotate and cable 44 unwinds therefrom, permitting the joined post structure 16, 16 to rotate forwardly under the weight of the descending hay rake 14.

As explained above, cable 49 is rewound on reel 51 due to the pressure of hay exerted rearwardly against the hay buck member 15 as the hay rake is being loaded. During this operation brake drum 20 is released since hand lever 34 is in its middle position.

While a specific embodiment of a hay stacker device has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A hay stacker structure comprising a pair of boom members pivotally secured to the rear portion of a tractor chassis and extending forwardly of the tractor, a hay rake secured to the forwardly projecting end portions of said boom members, a post structure pivotally secured to the front end of the tractor chassis and normally extending forwardly and upwardly with respect to the tractor, a flexible member connecting the upper portion of said post structure to the hay rake, said post structure being adapted to rotate in a rearward direction in the vertical plane of the tractor to thereby elevate the rake, a ram member slidably mounted for longitudinal movement on said rake and extending transversely thereof, said ram member being adapted to be moved forwardly on said rake to discharge hay therefrom, a power take off device adapted to be driven by the tractor power shaft, a control member for said power take off device, a first cable means connected between said power take-off device and said post structure adapted to rotate said post structure rearwardly when said control member is in a first position, a second cable means connected between said power take-off device and said ram member adapted to move said ram member forwardly when said control member is in a second position, spring means biasing said control member to a third position substantially intermediate said first and second positions, and brake means adapted to lock said first cable means in stationary condition when said control member is in its third position.

2. The structure of claim 1, and wherein a release device is provided adapted to release said first cable means from its locked condition without moving said control member into either its first or second positions.

3. The structure of claim 1, and wherein said control member is adapted to be automatically moved toward its third position responsive to the attainment of a predetermined elevation by said rake.

4. The structure of claim 1, and wherein said brake means is adapted to be released to unlock said first cable means by partial movement of said control member from its third position toward its first position.

5. In a power buck rake adapted to be mounted on a tractor having pivotal means for mounting same on the tractor frame, a buck member movable forwardly over the rake to expel hay therefrom, the combination of a dual drum-winding and unwinding mechanism, separate brake means cooperating with each drum, a cable from one drum to be pivotal mounting means for swinging the buck rake on the tractor frame, a cable from the second drum to the buck member for operating same forwardly, and a linkage for simultaneously locking the brake means on one drum and unlocking same on the other drum.

6. In a power buck rake adapted to be mounted on a tractor having a power take-off shaft and pivotal means for mounting the buck rake on the tractor frame, a buck member movable forwardly over the rake to expel hay therefrom, the combination of a dual drum-winding and unwinding mechanism, individual brake means cooperating with the drums, a drive from said power take-off shaft to the winding and unwinding mechanism comprising a clutch for selectively operating either drum from the power take-off shaft, a lever for operating said clutch, a linkage interconnecting said lever and the brake means for locking the brake means on one drum when the clutch is engaged to drive the other drum, a cable from one drum to the pivotal mounting means for swinging the buck rake on the tractor frame, and a cable from the other drum to the buck member for operating same forwardly.

7. In a power buck rake adapted to be mounted on a tractor having pivotal means for mounting same on the tractor frame, a buck member movable forwardly over the rake to expel hay therefrom, the combination of a first winding and unwinding mechanism including a cable for operating said buck member forwardly, a second winding and unwinding mechanism driven from the tractor, and cables from the second winding and unwinding mechanism to the pivotal mounting means for the buck rake and to the first winding and unwinding mechanism.

8. In a power buck rake adapted to be mounted on a tractor having pivotal means for mounting same on the tractor frame, a buck member movable forwardly over the rake to expel hay therefrom, the combination of a winding and unwinding mechanism comprising dual drums and associated brake mechanism for each drum, a clutch mechanism for operating the drums from the tractor, a first lever for operating the clutch mechanism, a linkage interconnecting said clutch mechanism and the brake-operating mechanism on the drums, a cable from one drum to the pivotal mounting means for swinging the buck rake on the tractor frame, a cable from the other drum to the buck member for operating same forwardly on the rake, and a second lever interconnected to said linkage for operating the brake mechanism on the cable drums in a lesser range of operation than that required for operation of the clutch by the first lever.

9. In a power buck rake adapted to be mounted on a tractor having pivotal means for mounting same on the tractor frame, a buck member movable forwardly over the rake to expel hay therefrom, the combination of a winding and unwinding mechanism comprising dual drums and associated brake mechanism for each drum, a clutch mechanism for operating the drums from the tractor, a lever for controlling the clutch mechanism, linkage interconnecting said clutch-controlling lever and the brake-operating mechanisms on the drums, and a second linkage interconnecting said pivotal mounting means and the clutch-operating lever for returning the latter to the neutral position when the buck rake is swung to upper limit position.

FRANK L. SELAK.

REFERENCES CITED

The following references are of record in the file of this patent:

UNITED STATES PATENTS

| Number | Name | Date |
| --- | --- | --- |
| 2,246,083 | Weber | June 17, 1941 |
| 2,306,474 | Tieslau | Dec. 29, 1942 |
| 2,311,523 | Cope et al. | Feb. 16, 1943 |
| 2,397,045 | Richey | Mar. 19, 1946 |
| 2,404,154 | Williams | July 16, 1946 |